Figure 1:
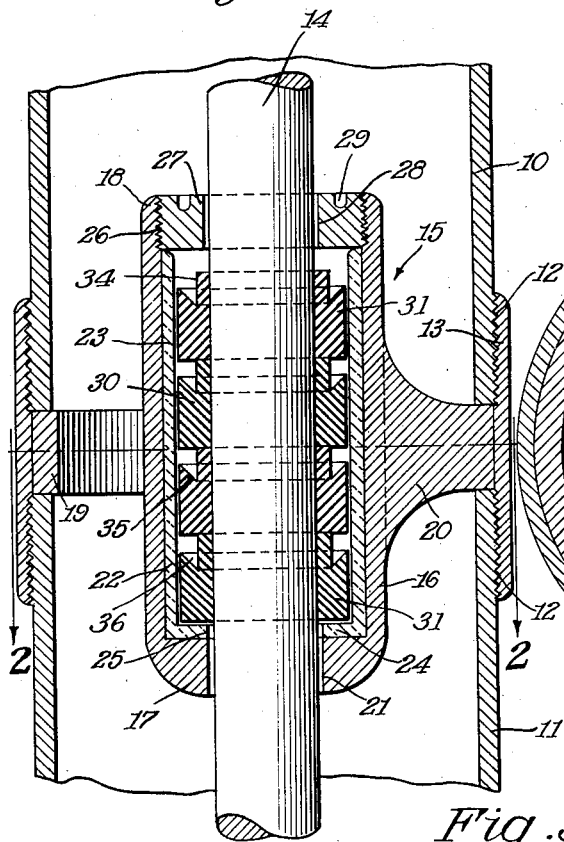

Aug. 19, 1941.　　F. M. CALDWELL　　2,253,416

BEARING AND BEARING RETAINER

Filed July 22, 1940

Farley M. Caldwell
INVENTOR

BY Victor J. Evans & Co.
ATTORNEYS

Patented Aug. 19, 1941

2,253,416

UNITED STATES PATENT OFFICE 2,253,416

BEARING AND BEARING RETAINER

Farley M. Caldwell, Cincinnati, Ohio

Application July 22, 1940, Serial No. 346,852

9 Claims. (Cl. 308—134.1)

My invention relates to new and useful improvements in bearings and bearing retainers.

An important object of my invention is to provide a bearing structure that is particularly adapted but not restricted for use in connection with deep well centrifugal pumps, which structure includes provision for receiving and retaining a portion of the fluid being pumped and provision for impinging the fluid thus retained against the friction developing bearing surfaces during the operation of the pump. The construction of the bearing being unique to permit the fluid thus impinged to be continuously and repeatedly used during the initial operation of the pump until the same has had sufficient time to raise the fluid level to a point above the bearing.

Conventional deep well pumps are not provided with a standing valve at the bottom thereof. It is necessary that the fluid being pumped drain from the pump when the same is not in operation to prevent freezing thereof during cold weather. Thus, when the pump ceases operation, the fluid will gravitate downwardly to the normal static level of the fluid within the well and, if the pump remains idle for a substantial period of time, the bearings in the pump become dry. Before the pump may again be operated it is necessary that the bearings be lubricated and, heretofore, the prelubrication of the bearings has been done in several ways.

One method is to position a storage tank above the pump, which tank is provided with a time delay relay and solenoid valve. The solenoid operates a valve leading from the tank to the bearings and permits water to run from the tank back into the well and over the bearings before the motor actually starts the pump. This method has always been considered faulty for the reason that the intricate electrical equipment does not always function. Also, if the pump is installed outside of the pump building in a cold climate, the water stored up in the tank for prelubrication purposes freezes.

Another method of prelubricating the bearings is to cut a notch or hole in the pump discharge check valve whereby the pump may provide a constantly running stream of water which returns to the well and lubricates the bearings. This method is disadvantageous for the reason that it is expensive and does not eliminate the difficulty of the water freezing if parts of the organization extend outside of the building.

If the bearing structure is used in a turbine type of centrifugal pump, each of the bearings above the static level of the water in the well must be prelubricated before the pump shaft is made to revolve. If the bearings, which are commonly made of rubber, are not prelubricated, they will become heated as a result of friction developed between the bearings and the bearing retainer. As a result of the heat developed by the friction, the rubber will become vulcanized to the surface of both the shaft and retainer. Vulcanizing of the bearing in the above manner will result in overloading of the driving motor and if the motor is not provided with a circuit breaker equipment it will burn up the motor. If the motor has ample overloading protection, the starting equipment will keep turning the motor off and on and the intervals during which the motor is operative are not of sufficient duration to permit the pump to deliver fluid from the well. It is, therefore, another object of my invention to provide a bearing which is uniquely associated with the driving shaft and the bearing retainer to prevent heating of the rotating bearing and the consequent difficulties hereinabove set forth.

If the bearing structure is incorporated in an open line shaft pump construction, it has heretofore been necessary to maintain the journal surfaces of the shaft in a smooth and polished condition; otherwise, the shaft will rust and effect rapid wear on the bearing thereby materially decreasing the efficiency of the pump. The procedure has been to use a stainless steel or other noncorrosive material in the shaft, or to wind a ribbon of noncorrosive material around the shaft at the bearing or to put a noncorrosive sleeve on the shaft. The above operations are expensive and entail the output of considerable work and money in their installation. Still another object of my invention, therefore, is to provide a bearing and retaining means wherein the parts having relative rotation may be expeditiously and inexpensively arranged to prevent corroding or rusting of the metallic parts.

Experience teaches that a substantial amount of static electricity is developed if a metallic shaft revolves in a metallic retainer or bearing. The static electricity magnetizes the shaft and creates hard spots which crystallize and in time cause the shaft to break. Yet another object of my invention is to provide a bearing structure wherein the friction faces of the bearing and retainer are normally spaced from each other and constructed of an electrically insulating material to prevent the development of static electricity therebetween.

Other objects and advantages of my invention will be apparent during the course of the following description.

Figure 2:
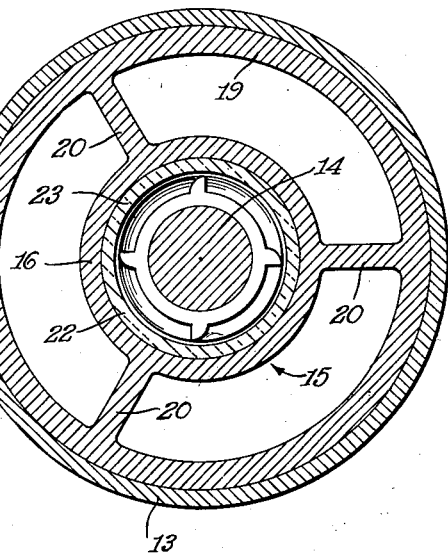
Figure 3:
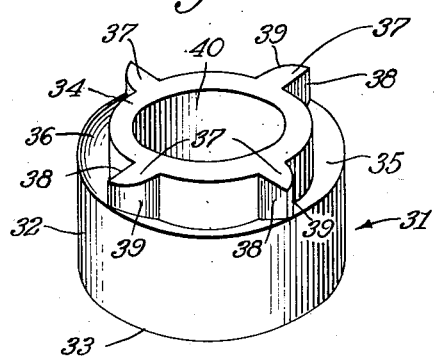

In the drawing, forming a part of this specification, and wherein like numerals are employed to designate like parts throughout the same, Figure 1 is a longitudinal sectional view, showing parts in elevation, of a bearing structure constructed in accordance with my invention, Figure 2 is a transverse sectional view taken on the line 2—2 of Figure 1, and Figure 3 is a perspective view of one of the lubricating bearing or sleeve sections.

In the accompanying drawing, wherein for the purpose of illustration, is shown a preferred embodiment of my invention, the numerals 10 and 11 designate pipe sections the adjacent ends of which are screw-threaded, as at 12, and joined in slight longitudinally spaced relation by the coupling 13. The present arrangement may be used in connection with any type of pump employing a vertical shaft, it is uniquely adapted for use in connection with a turbine pump having an open line shaft, and the pipe sections 10 and 11 and coupling 13 may be considered, for the purpose of illustration, as constituting part of such a construction. The conventional drive shaft 14 rotates centrally within pipe sections and it is, therefore, necessary to support the same at spaced intervals along its length.

The numeral 15 designates a metallic spider comprising a tubular casing 16 having a closed bottom 17 and open top 18. The casing is connected at substantially its middle to a concentrically arranged rim 19 by a plurality of radially extending webs 20. As best illustrated in Figure 1, the bottom of the casing is provided with a central opening 21 of slightly greater diameter than the diameter of the shaft 14 whereby the casing may be slipped over the shaft and whereby a portion of the shaft extends axially therethrough. The flange 19 is positioned in interposed relation between the ends of the pipe sections 10 and 11 and the opposite edges thereof are held in tight fitting abutting engagement therewith by the coupling 13.

A liner 22 is snugly received within the internal cavity of the casing, the cylindrical body portion 23 thereof being pressed against the inner wall of the casing and the bottom 24 thereof overlying the bottom of the casing and with the central opening 25 in register with the opening 21. The liner is formed from glass, viterious porcelain enamel or other suitable nonconductors of electricity. The liner may be separately manufactured and inserted into the casing or a suitable nonconducting substance may be baked directly into the liner in accordance with the exigencies of the particular situation. The upper end of the liner terminates a substantial distance within the casing and the portion of the casing extending thereabove is internally screw-threaded as at 26 to receive the plug 27. The plug is formed with a central opening 28 of slightly greater diameter than the diameter of the shaft and the upper face thereof is formed with recesses 29 adapted to receive a suitable tool for insertion and removal of the plug.

The portion of the shaft extending through the casing carries a sleeve bearing 30 preferably, though not necessarily, constructed from a plurality of bearing or sleeve sections 31. Each of the sections is identical in its construction and comprises a cylindrical base 32 having a slightly smaller outside diameter than the internal diameter of the liner 22. The bottom face 33 of the section is flat and extends at right angles to the side walls thereof. The upper end 34 of the section is of reduced diameter and the wall 35 connecting the base with the reduced upper end slopes downwardly from the periphery of the base to define an annular pocket or gutter 36 around the reduced portion. A plurality of radially extending fins 37 project from the vertical wall of the reduced portion and terminate flush with the vertical wall of the base 32. As best illustrated in Figure 3, one side 38 of each of the fins is flat and the opposite side 39 thereof is arcuate.

Each of the sections 31 is provided with a central bore 40 which is adapted to snugly receive the portion of the shaft 14 extending through the casing in a manner to hold the section fixedly associated for rotation with the shaft. A plurality of the sections are stacked in superposed relation relative to each other whereby the bottom wall 33 of an upper section bears against the reduced portion 34 of the subjacent section and projects therebeyond to close the gutter 36. I have found that the sleeve may be more easily constructed if made in sections, however, it is obvious that if desired it could be made from a single elongated sleeve member. The bearing sleeve may be made of any suitable material. By way of example, I have found that if water is to be used as a lubricant, such materials as rubber, leather, neoprene micarta, and the like are satisfactory. If oil is used as a lubricant the sleeves may be made of hardened steel and sweated or otherwise fixedly secured to the shaft.

In operation, the shaft 14 will be rotated and the sleeve 30 will rotate therewith relative to the liner 22. Clearance between the openings in the casing and plug and the shaft is greater than the clearance between the periphery of the sleeve and the internal face of the liner 22 whereby frictional engagement of the rotating parts with the stationary parts will be restricted to the outer faces of the sleeve sections and the inner face of the liner. The nonelectrically conducting properties of either the sleeve or liner efficaciously prevent the development of static electricity during the operation of the pump. When the fluid in the well is caused to rise by actuation of the pump, a portion of the fluid will have access to the interior of the casing and the grooves or gutters 36 of the bearing sleeve will become filled with the fluid. When the pump is stopped or stands idle for a considerable length of time, the fluid will remain within the grooves and, because of the distance of the bearing below the ground surface, evaporation of the fluid will be slight and danger of freezing of the same will be negligible. The arcuate sides 39 of the fins are arranged to face in the direction of rotation of the shaft so that rotation of the shaft after the same has been standing idle will cause the arcuate faces of the fins to continuously impinge the fluid outwardly and upwardly from the gutters and against the wall of the liner by centrifugal force. While the fins impinge the fluid from the grooves at an essentially high velocity, it is obvious that they could be omitted without affecting the operativeness of the organization. The inclined relation of the wall 35 and centrifugal force effected by rotation of the sleeve would cause the fluid to be dispersed outwardly and upwardly from the gutters. As the fluid thus impinged from the grooves gravitates downwardly between the liner and sleeve bearing the groove from which the fluid was ejected will catch a portion of the fluid. The rest of the fluid will flow over the walls of the casing and sleeve bearing below the groove to lubricate the same and a portion of this fluid will be received by the subjacent groove. The fluid will thus be continuously and repeatedly impinged outwardly and upwardly and the relatively small quantity of fluid originally retained within the grooves will be used over and over again in prelubricating the bearing until the fluid within the well rises above the bearing structure. Only a small portion of the fluid, therefore, will find egress through the lower openings 25 and 21 of the liner and casing.

It may thus be seen that prelubrication will be effected the moment rotary motion is imparted to the shaft and bearing sleeve, sufficient liquid being originally retained by the grooves to maintain all of the friction surfaces of the bearings well lubricated until the pump has had sufficient time to raise the fluid level of the well to the height of the bearing. By using the hereindescribed arrangement it is unnecessary to use storage tanks, solenoid valves and intricate time delay equipment in order to achieve efficient and efficacious prelubrication. The pump will not freeze in cold weather nor can the bearing sleeve vulcanize itself to the surrounding walls of the casing by reason of lack of initial lubrication. In the present construction it is not necessary to make the shaft from stainless steel or other noncorrosive material and, by reason of the fact that the bearing sleeve rotates with the pump, it is not necessary to put any kind of noncorrosive ribbon or sleeve over the shaft where the same rotates in the bearing. The unique arrangement of the parts permits the manufacturer of the pump to use inexpensive shafting. Further, by reason of the fact that all the friction faces of the bearing sleeve contact a liner of nonelectrically conducting material, no static electricity can possibly be effected by rubbing of these parts against each other.

Any number of the sleeve sections 31 may be used or the sleeve bearing may be constructed from a single piece of material. Any construction which provides reservoirs which retain fluid from the well when the pump is not in operation and which are adapted to impinge the fluid outwardly and upwardly from the reservoirs upon operation of the pump is within the scope of the present invention.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A self-lubricating bearing structure for a rotating shaft comprising a sleeve of non-conducting material adapted to be fixedly secured to the shaft for rotation therewith, and a casing also of non-conducting material enclosing the sleeve and supporting the shaft, the periphery of the sleeve being normally spaced from the casing and having a plurality of spaced grooves opening therethrough, the bottom wall of the groove sloping downwardly from the peripheral opening to provide pockets for receiving and retaining a fluid, which sloping wall directs the fluid retained outwardly and upwardly through the groove opening and into the interstice between the sleeve and casing immediately upon operation of the shaft.

2. A self-lubricating bearing structure for a rotating shaft comprising a rubber sleeve adapted to be secured to the shaft for rotation therewith, a casing enclosing the sleeve and having provision for supporting the shaft, and a liner formed of a nonelectrically conducting material snugly received within the casing and spaced from the sleeve, said sleeve having pockets opening upwardly and outwardly through its outer periphery for receiving and retaining a fluid, said pockets directing the fluid retained outwardly and upwardly through the pocket opening immediately upon operation of the shaft.

3. A self-lubricating bearing structure for a rotating shaft comprising a rubber sleeve adapted to be secured to the shaft for rotation therewith, a casing enclosing the sleeve and having provision for supporting the shaft, and a liner formed of a nonelectrically conducting material snugly received within the casing and spaced from the sleeve, said sleeve having a plurality of spaced annular grooves opening through its peripheral face and against the inner surface of the liner for receiving and retaining a fluid, each of said grooves being provided with a plurality of annularly spaced radial fins for impinging the fluid from the groove during the rotation of the shaft.

4. In a self-lubricating bearing structure for a rotating shaft, a hollow casing receiving the shaft, a nonelectrically conducting sleeve fixedly secured to the portion of the shaft extending through the casing, a nonelectrically conducting liner snugly fitting within the casing and in slight spaced relation with the friction surfaces of the rotating sleeve, and fluid retaining means rotatable with the shaft for impinging by centrifugal force a fluid contained thereby into the interstice between the sleeve and casing immediately upon rotation of the said shaft.

5. A self-lubricating bearing structure for a rotating shaft, comprising a hollow casing receiving the shaft, a plurality of sleeve sections fixedly secured to the portion of the shaft extending through the casing, each of said sections having surface cavities for the reception and retention of a fluid, whereby the fluid may be impinged from the cavities to lubricate the shaft immediately upon operation of the shaft, and an electrically insulating liner interposed between the friction faces of the sleeve sections and the casing and arranged in slight spaced relation with the said sections.

6. A self-lubricating bearing structure for a rotating shaft comprising a plurality of sleeve sections adapted to be fixedly secured to the shaft, each of said sections having surface cavities for the reception and retention of a fluid, whereby the fluid may be impinged from the cavities to lubricate the shaft immediately upon operation of the shaft, means for supporting the shaft, and an electrically insulating material arranged in slight spaced relation with the friction faces of the sleeves.

7. A bearing of the self-lubricating type for use on the shaft of a deep well pump, comprising a sleeve having a plurality of annular grooves opening through the peripheral face therein, each of said grooves being formed with a downwardly sloping bottom wall for providing a concavity below the groove opening and each of the grooves having a plurality of annularly spaced radial fins for discharging fluid contained by the concavities upon rotation of the shaft and sleeve.

8. A bearing comprising a rotatable member of non-conducting material, and a stationary member also of non-conducting material surrounding the said rotatable member, said stationary member having a plurality of spaced annular grooves opening through the peripheral face thereof, each of said grooves being formed with a downwardly sloping bottom wall providing a concavity below the groove opening for receiving and retaining a fluid, said concavities directing the fluid contained outwardly and upwardly through the groove opening immediately upon actuation of the said rotatable member.

9. A bearing comprising a rotatable member, and a stationary member surrounding the said rotatable member, said stationary member having a plurality of spaced annular grooves opening through the peripheral face thereof, each of said grooves being formed with a downwardly sloping bottom wall providing a concavity below the groove opening, and each of the grooves having a plurality of angularly spaced radial fins for discharging fluid contained by the concavities upon actuation of the said rotatable member.

FARLEY M. CALDWELL.